July 17, 1951  A. B. HAWKINS  2,560,571
GAUGE

Filed Nov. 3, 1947  2 Sheets-Sheet 1

Aline B. Hawkins
INVENTOR.

BY Clarence A. O'Brien
and Harvey B. Jacobson
Attorneys

July 17, 1951　　　　　A. B. HAWKINS　　　　2,560,571
GAUGE

Filed Nov. 3, 1947　　　　　　　　　　　　2 Sheets-Sheet 2

Aline B. Hawkins
*INVENTOR.*

BY *Thomas A. O'Brien
and Harvey B. Jackson*
Attorneys

Patented July 17, 1951

2,560,571

UNITED STATES PATENT OFFICE 2,560,571

GAUGE

Aline B. Hawkins, Bellflower, Calif.

Application November 3, 1947, Serial No. 783,820

1 Claim. (Cl. 33—172)

This invention relates to a gage and has for its primary object to explore a surface and register high or low portions thereon.

Another object is to give a direct reading in fractions of a measuring unit such as an inch of the depth or height of an irregular portion in or on a flat surface.

A further object is to facilitate the measuring of the curvature of a surface and to indicate the existence of pits, or humps thereon, and the magnitude of their depth or height.

The above and other objects may be attained by employing this invention which embodies among its features a casing having an indexed dial and a pointer movable over the face of the dial for cooperation with the indices thereon, an externally screw threaded tubular boss projecting laterally from the casing, a tubular plunger mounted in the tubular boss for longitudinal movement thereof, means coupling the tubular plunger with the pointer to cause the latter to move over the face of the dial in unison with the movements of the plunger, and an exploring needle removably entering the tubular plunger through the boss and adapted to impart movement to the plunger as the gage is moved over a piece of work to be explored.

Other features include an arched foot piece removably fitted on the threaded boss for cooperation with the needle in determining the depth of a recess or the height of an irregularity in the surface being explored.

Other features include a flexible tube detachably coupled at one end to the threaded boss, a flexible cable movable longitudinally within the tube, means at one end of the cable for entering the tubular plunger and coupling the cable thereto, an externally screw threaded sleeve at the end of the flexible tube remote from the threaded boss, a socket coupled to the flexible cable at the end remote from the end coupled to the plunger, said socket being slidable in the sleeve, an exploring needle removably entering the socket through the threaded end of the sleeve, and an arched foot piece removably fitted on the sleeve for cooperation with the needle in determining the depth of the recess or the height of an irregularity in a surface being explored.

Figure 1:
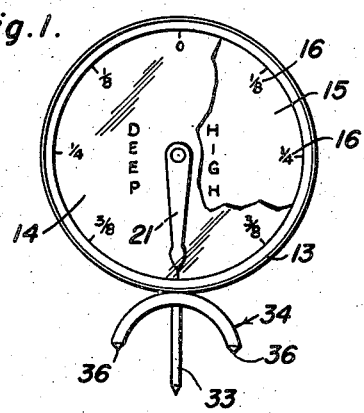
Figure 1 is a front view of a gage embodying the features of this invention showing it wholly removed from contact with a surface.

Referring now to the drawings in detail this improved gage designated generally 10 comprises a casing 11 of substantially circular formation provided at one end with external screw threads 12 onto which a suitable bezel 13 is threaded, and in which a transparent panel 14 of any suitable material such as glass is retained. A suitable dial 15 is fixed within the casing 11 adjacent the bezel 13 and beneath the transparent panel 14, and this dial is provided on its exposed face with suitable indices 16.

Mounted on a suitable spindle 17 which extends through the back wall of the casing 11 and the dial 15 centrally thereof is a pinion 18 carrying a forwardly projecting hub portion 19 provided at its end remote from the pinion 18 with a squared portion 20 on which a pointer 21 is fixed. As illustrated this pointer operates over the face of the dial 15 beneath the transparent panel 14, and cooperates with the indices 16 in measuring the depth or height of irregularities in a surface. Entering the side of the casing 11 and projecting radially therethrough is a tubular boss 22, the outer end of which is externally screw threaded as at 23 for a purpose to be more fully hereinafter described. Mounted for sliding movement longitudinally within the boss 22 is a tubular plunger 24, and extending laterally from the end of the plunger 24 remote from that which enters the boss 22 is an arm 25 carrying a rack 26, the teeth of which mesh with the teeth of the pinion 18, so that as the plunger 24 moves in the tubular boss 22, the pinion 18 will be rotated and cause the pointer 21 to move over the face of the dial. Projecting outwardly from the rack 26 on the side remote from the pinion 18 is an arm 27 to which is coupled as at 28 one end of a retractile coil spring 29, the opposite end of which is anchored as at 30 to the casing 11. This spring 29 is so tensioned that when relaxed, the pointer 21 will assume the position illustrated in Figure 1, so that its index end overlies the one-half mark on the dial.

Figure 6:
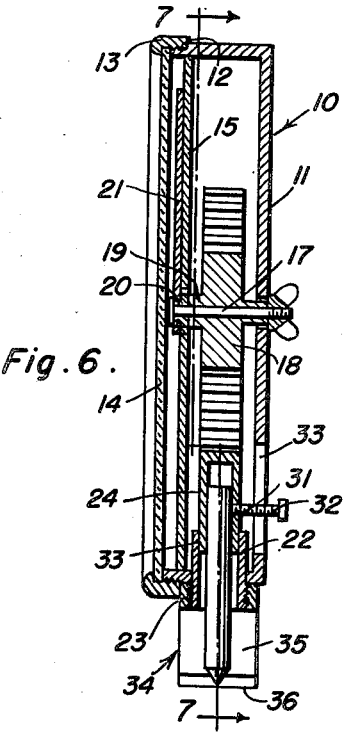
Figure 6 is an enlarged longitudinal sectional view through the gage illustrated in Figure 1.

As illustrated in Figure 6 the tubular plunger 24 is provided intermediate its ends with an internally screw threaded opening 31 for the reception of a clamp screw 32 which projects outwardly through a slot 33 formed in the back of the casing 11, and entering the end of the tubular plunger 24 which operates within the tubular boss 22 is an exploring needle 33 which is held in various adjusted positions within the plunger by means of the screw 32.

Figure 2:
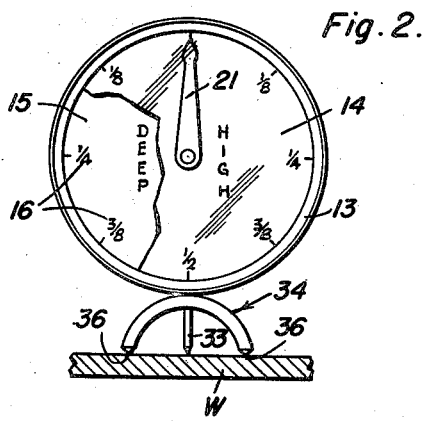
Figure 2 is a view similar to Figure 1 showing the gage used in exploring a flat surface.
Figure 3:
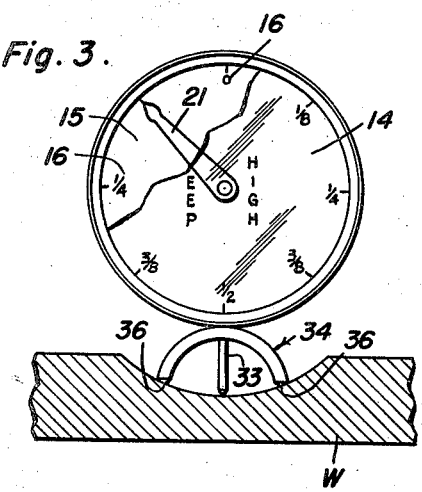
Figure 3 is a view similar to Figure 1 showing the gage in use in exploring a concave surface.
Figure 4:
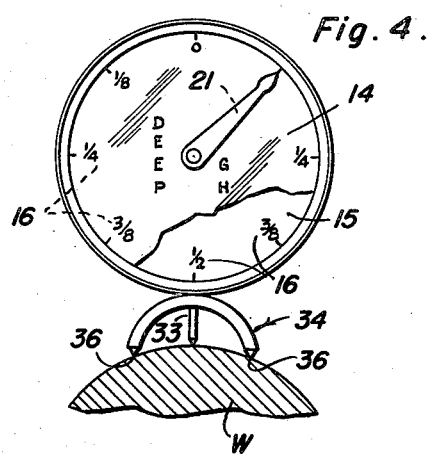
Figure 4 is a view similar to Figure 3 illustrating the gage in use in exploring a convex surface.
Figure 5:
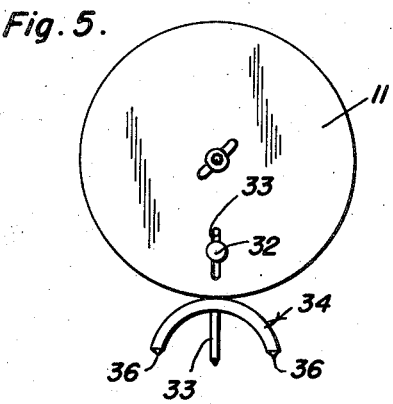
Figure 5 is a rear view of the gage illustrated in Figure 1.

Threaded onto the threaded end 23 of the boss 22 is a foot piece designated generally 34 which comprises an arched body 35 provided at opposite ends with knife edges 36 which are adapted to engage the surface to be explored as illustrated in Figures 2 through 4 inclusive.

In use the exploring needle 33 is entered into the tubular plunger 24 to the desired extent and clamped therein by means of the clamping screw 32 which is turned through the screw threaded opening 31 so that its point or inner end will impinge against the needle 33. Under ordinary circumstances the needle is adjusted as illustrated in Figure 1 so that it projects beyond the lower ends of the knife edges 36 to the extent of exactly one-half of one-inch. When the device is then placed on a plane surface, the pointer 21 will move across the face of the dial to the zero position as illustrated in Figure 2, and as the gage is advanced over the face of the work W, any pits or irregular areas on the surface will be registered by the movement of the pointer 21 over the face of the dial and the magnitude of the irregularity will be indicated by the indices 16. When a concave or convex surface is to be gaged the exploring needle 33 is adjusted to project from the plunger a distance such that when measuring a smooth curved surface the index pointer 21 will register zero. Hence when an irregular area of the curved surface is encountered, the magnitude of the irregularity will be determined by the amount of deflection of the index pointer from the zero position on the dial. Deflection of the pointer to one side of the zero mark will indicate that the irregularity is a high spot while deflection to the opposite side will show that the irregularity is a low spot or pit and the magnitude of the irregularity may be determined by examination of the index on the dial toward which the pointer is directed.

Figure 8:
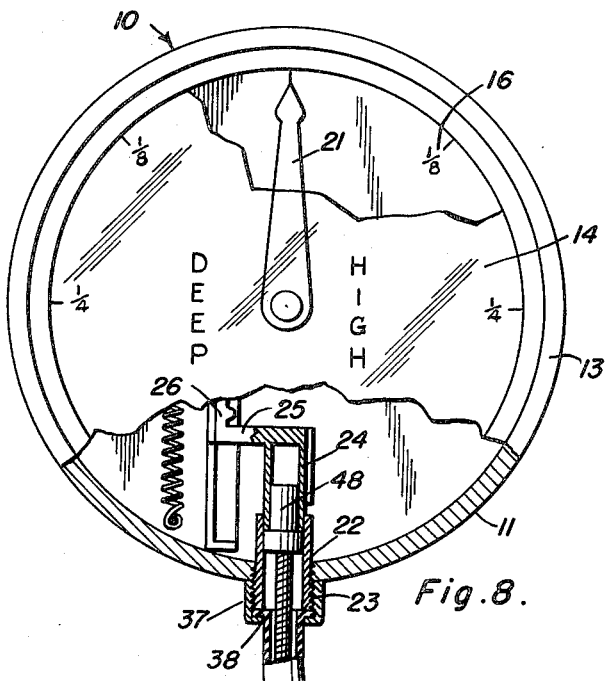
Figure 8 is a front view of the gage illustrated in Figure 1 on an enlarged scale, illustrating a device for enabling the remote exploration of a surface.
Figure 7:
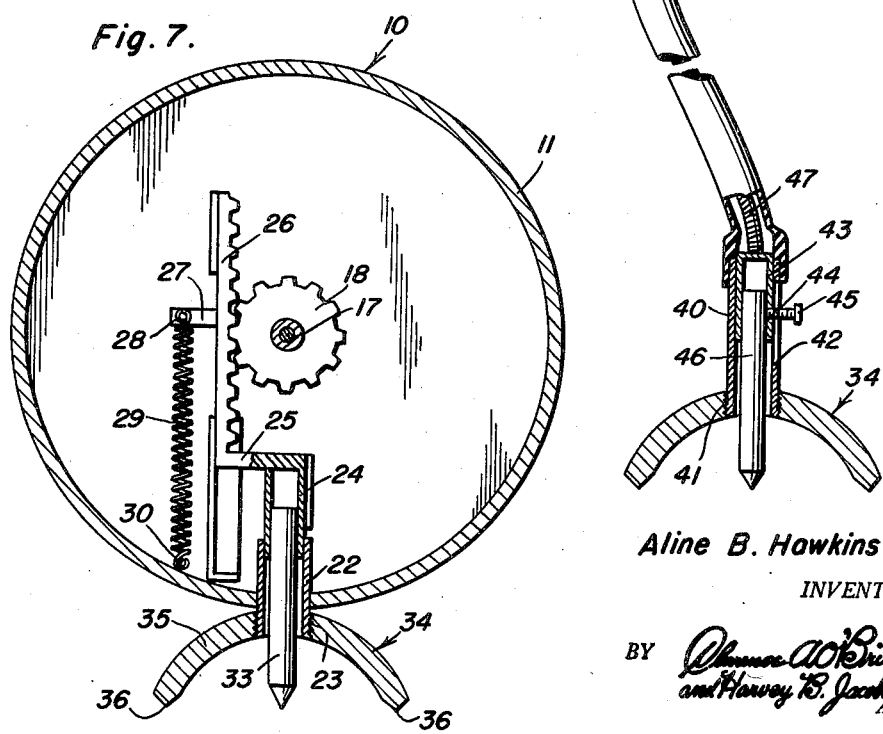
Figure 7 is a sectional view taken substantially along the line 7—7 of Figure 6.

In some instances it is desirable to explore surfaces at a point remote from the gage in which event the attachment illustrated in Figure 8 is employed. The foot piece 34 is first removed from the tubular boss 22, and threaded thereon is a coupling member 37 by means of which the flanged end 38 of a flexible tube 39 is connected to the tubular boss. Carried at the end of the flexible tube 39 remote from the coupling 37 is a sleeve 40 carrying at its end remote from the tube 39 external screw threads 41 which correspond to the threads 23 on the boss 22. The foot piece 34 is threaded onto the threaded end 41 of the sleeve 40, and formed in the sleeve intermediate its ends is a longitudinal slot 42, the purpose of which will be more fully hereinafter explained. Mounted for longitudinal sliding movement in the inner end of the sleeve 40 is a socket 43 which is provided intermediate its ends with an internally screw threaded opening 44 for the reception of a clamp screw 45 which projects outwardly through the slot 42 in the sleeve 40. This clamp screw is adapted to clamp the exploring needle 33 in place in the socket 43 as will be readily understood upon reference to the drawings. Coupled to the end of the socket 43 opposite that into which the needle 33 is introduced is one end of a flexible cable 47 which as illustrated extends longitudinally through the flexible tube 39 and carries at the end remote from the socket 43 a shouldered coupling member 48 which is adapted to enter the tubular plunger 24, and to be held therein by the clamp screw 32 previously referred to. It will thus be seen that as the exploring needle 33 moves the socket 43 within the tubular sleeve 40, the plunger 24 will be moved by the coupling member 48, thus to cause the index pointer 21 to move over the face of the dial. With the foot 34 screwed onto the threaded end 41 of the sleeve 40 it is obvious that the attachment may be used in the same manner as the gage previously described, and the existence and magnitude of high or low points in the surface of a piece of work may be read directly on the dial 15.

While in the foregoing there has been shown and described the preferred embodiment of this invention it is to be understood that minor changes in the details of construction, combination and arrangement of parts may be resorted to without departing from the spirit and scope of the invention as claimed.

Having described the invention, what is claimed as new is:

A gage comprising a casing having an indexed dial and a pointer balanced by a spring, said pointer being movable over the face of the dial, means for actuating said pointer against the effort of said spring comprising an externally threaded tubular boss projecting radially through the casing, a tubular plunger having a threaded bore, said tubular plunger being mounted in said tubular boss for longitudinal movement therein, means coupling the tubular plunger with the pointer to cause the latter to move over the face of the dial against the effort of the spring, said casing having an elongated slot therein which aligns with the bore in the tubular plunger, and a set screw projecting through said slot and threadedly secured in said tubular plunger and extending through said threaded bore to removably hold an exploring element in said plunger.

ALINE B. HAWKINS.

REFERENCES CITED

The following references are of record in the file of this patent:

UNITED STATES PATENTS

| Number | Name | Date |
| --- | --- | --- |
| 900,531 | Hardinge | Oct. 6, 1908 |
| 1,043,954 | Merry | Nov. 12, 1912 |
| 1,637,024 | Maynard | July 26, 1927 |
| 1,683,710 | Zitsmann | Sept. 11, 1928 |
| 1,971,628 | Sutterlin | Aug. 28, 1934 |
| 2,178,745 | Emery | Nov. 7, 1939 |
| 2,404,751 | Schmitt | July 23, 1946 |